United States Patent
Moriyasu et al.

(10) Patent No.: US 9,434,841 B2
(45) Date of Patent: Sep. 6, 2016

(54) ASPHALT MIXTURE, PROCESS FOR PRODUCTION OF SAME, AND PAVING METHOD USING SAME

(71) Applicant: MAEDA ROAD CONSTRUCTION CO., LTD., Tokyo (JP)

(72) Inventors: Hirochika Moriyasu, Tokyo (JP); Kentaro Koshi, Tokyo (JP); Hiroshi Taniguchi, Tokyo (JP)

(73) Assignee: MAEDA ROAD CONSTRUCTIONS CO., LTD, Tokyo (JP)

( * ) Notice: Subject to any disclaimer, the term of this patent is extended or adjusted under 35 U.S.C. 154(b) by 204 days.

(21) Appl. No.: 14/158,705

(22) Filed: Jan. 17, 2014

(65) Prior Publication Data
US 2015/0203684 A1 Jul. 23, 2015

(51) Int. Cl.
  *C08L 95/00* (2006.01)
  *E01C 7/18* (2006.01)

(52) U.S. Cl.
  CPC .............. *C08L 95/00* (2013.01); *E01C 7/18* (2013.01); *C08L 2555/22* (2013.01); *C08L 2555/64* (2013.01)

(58) Field of Classification Search
  CPC ........ C10C 3/00; C09D 195/00; C08L 95/00
  See application file for complete search history.

(56) References Cited

U.S. PATENT DOCUMENTS

| | | | | |
|---|---|---|---|---|
| 2,730,506 A | * | 1/1956 | Sommer | C08K 5/098 106/277 |
| 2,919,204 A | * | 12/1959 | Schubert | C08K 5/19 106/269 |
| 3,951,676 A | * | 4/1976 | Elste, Jr. | C08L 95/005 106/232 |
| 4,547,224 A | * | 10/1985 | Schilling | B01F 17/0042 106/269 |
| 5,336,438 A | * | 8/1994 | Schilling | C08L 95/005 106/277 |
| 2003/0091389 A1 | * | 5/2003 | Zentner | E01C 11/005 404/17 |
| 2010/0199886 A1 | * | 8/2010 | Day | C08L 95/00 106/273.1 |
| 2011/0168943 A1 | * | 7/2011 | Arthur | C09K 3/22 252/88.1 |
| 2012/0060722 A1 | * | 3/2012 | Montpeyroux | C04B 26/26 106/235 |

FOREIGN PATENT DOCUMENTS

JP 2010-248472 A 11/2010
WO WO2011/086722 A1 7/2011

OTHER PUBLICATIONS

Harima Chemicals, Inc. "Tall Oil Products" (2009). http://www.youngscorp.com/bbs/download.php?bo_table=Toll_oil&wr_id=2&no=0.*
Hanna Lappi and Raimo Alen, "Pyrolysis of Tall Oil-Derived Fatty and Resin Acid Mixtures," ISRN Renewable Energy, vol. 2012, Article ID 409157, 8 pages, 2012. doi:10.5402/2012/409157.*

* cited by examiner

*Primary Examiner* — Kaj K Olsen
*Assistant Examiner* — Alexandra M Moore
(74) *Attorney, Agent, or Firm* — Muncy, Geissler, Olds & Lowe, P.C.

(57) ABSTRACT

An ordinary temperature construction type hot asphalt mixture is provided which comprises an aggregate, an asphalt, a lubricative solidification material and an alkaline additive material that are mixed together, wherein the lubricative solidification material contains a fatty acid and a resin acid with a ratio of 99.5:0.5 to 80:20 as a weight ratio of "fatty acid:resin acid".

2 Claims, 2 Drawing Sheets

ASPHALT MIXTURE, PROCESS FOR PRODUCTION OF SAME, AND PAVING METHOD USING SAME

TECHNICAL FIELD

Figure 1:
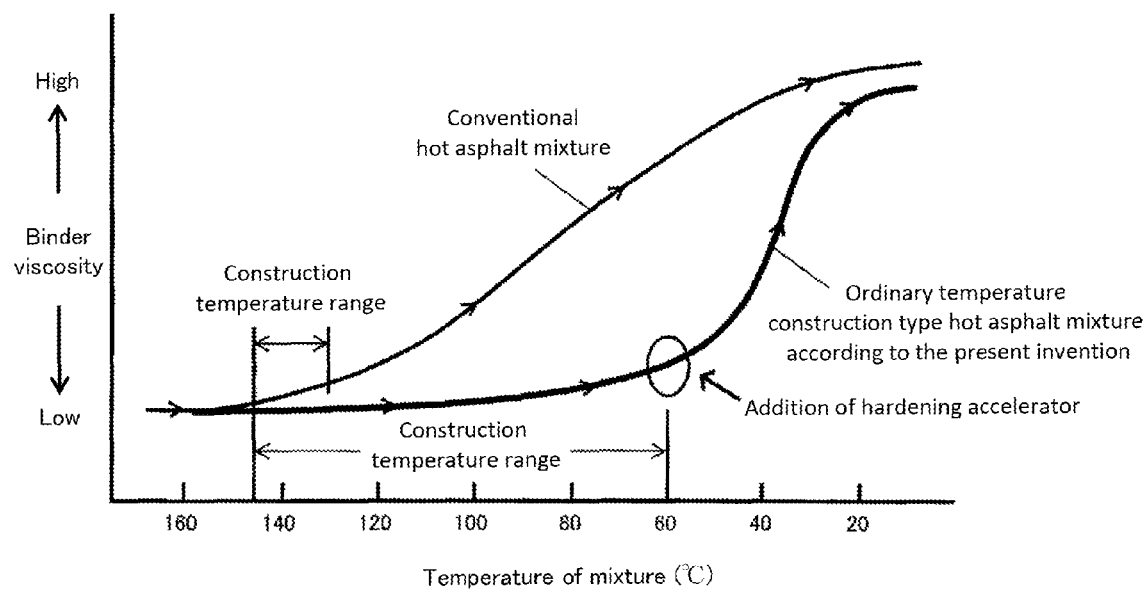

The present invention relates to an asphalt mixture to be used for road pavement and a process for production of the same, and also relates to a paving method using the same.

BACKGROUND ART

A hot asphalt mixture is usually used under an initial compacting temperature within a range of 110-140° C., such as provided by Pavement Construction Handbook ("Hosou Sekou Binran" in Japanese).

In addition, a hot asphalt mixture that utilizes warm-mix technique, i.e., a warm-mix asphalt mixture, is generally supposed to allow the available temperature range of the hot asphalt mixture to be extended about 30° C. toward the lower limit side.

However, even if the hot asphalt mixture can have a large strength immediately after being paved, the available period of time is until the temperature of the mixture decreases, so that the application thereof may be difficult under various conditions, such as when a small amount of the mixture is divided and used several times, when the mixture is carried spending a long period of time, and when a significant temperature decrease is caused immediately after the mixture is spread because the constructed thickness is thin such as by a thin layer overlay method.

On the other hand, the warm-mix asphalt mixture allows the available temperature range to be extended about 30° C. toward the lower limit side compared with that of the hot asphalt mixture, but sufficient effect may not be obtained under such conditions as described above.

In this respect, various asphalt mixtures of ordinary temperature construction type are proposed for pavement construction using the asphalt mixtures under ordinary temperature (100° C. or less).

For example, so-called cut-back asphalt mixture is proposed in which the viscosity of the asphalt mixture is forcibly reduced using mineral oil and the like. Such a cut back asphalt mixture, as disclosed in JP11-12475A, is to soften the asphalt using cut back material such as mineral oil thereby to develop the strength of the asphalt mixture due to the volatilization of the cut back material.

In addition, an ordinary temperature asphalt mixture using an asphalt emulsion is also proposed, but which has a relatively low strength even if the aggregate is not required to be heated and dried, and the applicable range is limited because the decomposition rate of the asphalt emulsion may have to be taken into consideration.

SUMMARY OF THE INVENTION

Problem to be Solved by the Invention

However, the method as described above, in which the viscosity at the time of pavement construction is forcibly reduced by cutting back the asphalt mixture using mineral oil and the like, involves drawbacks such as that the mixture strength when the traffic of a road is opened may considerably deteriorate and the curing may require a long period of time. To solve this problem, the cut back asphalt may have to be solidified rapidly after being constructed, but at present the mineral oil cannot be caused to solidify at ordinary temperature. On the other hand, the ordinary temperature asphalt mixture using an asphalt emulsion has a problem such that the emulsion may possibly flow out if it rains before the decomposition of the asphalt emulsion after pavement construction.

The present invention has been proposed in view of the above, and an object of the present invention is to provide an asphalt mixture that has excellent workability and can develop the strength within a relatively short period of time after pavement construction.

Means for Solving the Problems

As a result of intensive studies to solve the above problems, the present inventors have found that, when producing an asphalt mixture, a lubricative solidification material that contains a fatty acid and a resin acid with a certain ratio and an alkaline additive material are added to and mixed with an aggregate and an asphalt to decrease the viscosity of the asphalt thereby to allow pavement construction even if the mixture temperature decreases to ordinary temperature, while a hardening accelerator is fed to the mixture at the time of pavement construction so that the added lubricative solidification material and the alkaline component are subjected to saponification reaction to increase the viscosity, whereby the asphalt mixture can be provided which can develop a certain strength within a relatively short period of time, thus the present invention has been accomplished.

In particular, the present inventors have found that a lubricative solidification material obtained by compounding a certain amount of resin acid to fatty acid may be used to thereby appropriately enhance the strength of the obtained product under test and exhibit excellent workability not only under ordinary temperature but also under a low temperature condition, and the present invention has thus been accomplished.

That is, according to an aspect of the present invention, there is provided an ordinary temperature construction type hot asphalt mixture comprising an aggregate, an asphalt, a lubricative solidification material and an alkaline additive material that are mixed together, wherein the lubricative solidification material contains a fatty acid and a resin acid with a ratio of 99.5:0.5 to 80:20 as a weight ratio of "fatty acid:resin acid".

According to another aspect of the present invention, there is provided a paving method comprising: adding a hardening accelerator to the above asphalt mixture; and subjecting the lubricative solidification material and the alkaline additive material to saponification reaction thereby to enhance the strength.

According to further aspect of the present invention, there is provided a process for production of the above asphalt mixture, the process comprising: a first step that mixes an aggregate heated to 100-170° C. and an asphalt heated to 130-170° C. using a mixing apparatus; a second step that adds and mixes the lubricative solidification material to a mixture obtained in the first step; and a third step that adds and mixes the alkaline additive material to a mixture obtained in the second step.

Effects of the Invention

According to the present invention, the lubricative solidification material having a low viscosity is added thereby to enable pavement construction under ordinary temperature and the hardening accelerator is fed at the time of pavement construction so that the alkaline additive material in the mixture is ionically decomposed thereby being subjected to saponification reaction with the lubricative solidification material, and a high strength can thus be developed at an early stage.

In particular, according to the present invention, by using the lubricative solidification material which contains a fatty acid and a resin acid with a certain ratio, the workability can be improved not only under ordinary temperature but also under a low temperature condition (0° C., for example), and the asphalt mixture can appropriately be used even in cold regions.

Note that the asphalt mixture according to the present invention can take advantage of its workability and short period of time before developing the strength thereby to be preferably used as an asphalt mixture for repairing a paved road whether it is used in cold regions or not, for example.

DESCRIPTION OF EMBODIMENTS

Figure 2:
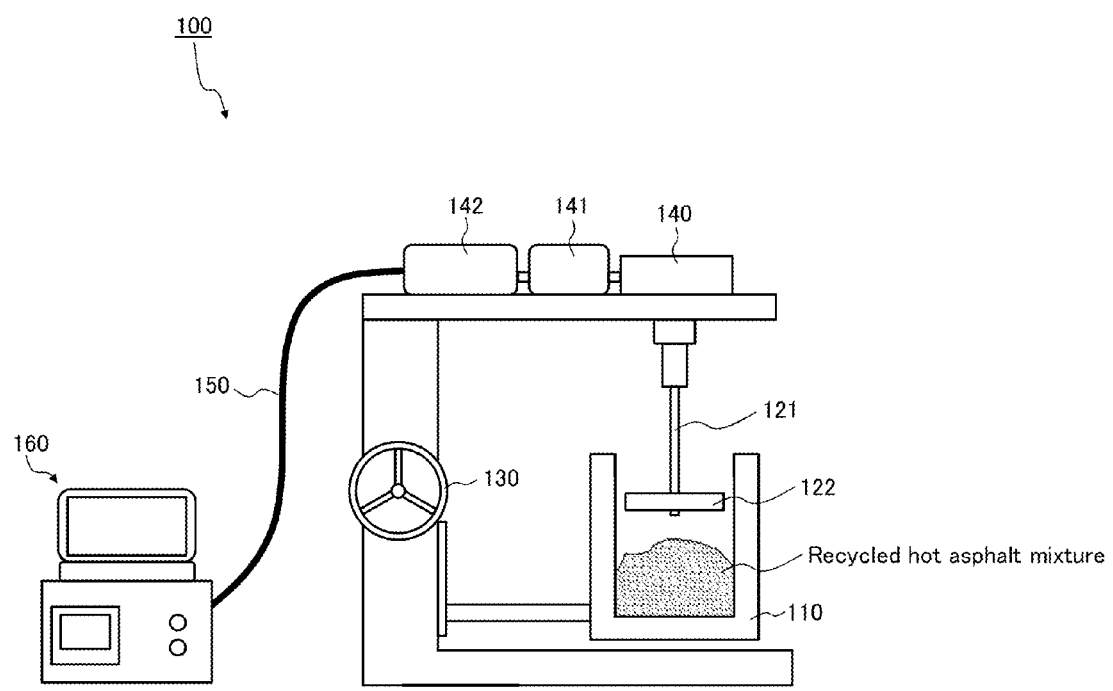

FIG. 1 is an explanatory diagram illustrating the concept of pavement construction temperature range each for the asphalt mixture according to the present invention and a conventional asphalt mixture; and FIG. 2 is a view illustrating a workability evaluation tester used in embodiments.

The asphalt mixture according to the present invention comprises an asphalt, an aggregate, a lubricative solidification material and an alkaline additive material that are mixed together, and is characterized in that the lubricative solidification material contains a fatty acid and a resin acid with a ratio of 99.5:0.5 to 80:20 as a weight ratio of "fatty acid:resin acid". The asphalt mixture according to the present invention is such that the hardening accelerator is fed at the time of pavement construction to cause the lubricative solidification material to be subjected to saponification reaction with an alkaline component originated from the alkaline additive material, thereby enhancing the strength. Note that examples of the hardening accelerator in the present invention include water.

The saponification reaction as used in the present invention may be enough if being a reaction of generating a fatty acid alkaline salt, and examples thereof include a saponification method in which an alkaline water is added to a fatty acid ester to generate a fatty acid alkaline salt (soap) and glycerin, and a neutralization method in which a higher fatty acid is neutralized by an alkaline water.

In the saponification reaction, if the alkaline additive material is added as a solid form without any solvent such as water, then the reaction does not commence in general. On the other hand, the presence of solvent such as water causes a reaction of "(fatty acid and resin acid in the lubricative solidification material)+(the alkaline additive material)+(water)=(soap (solid))" to generate a soap thereby developing the strength.

The asphalt mixture according to the present invention is configured to contain an asphalt, an aggregate, a lubricative solidification material and an alkaline additive material, and the microstructure thereof is considered as follows. That is, a lubrication film configured of the lubricative solidification material having a low viscosity and the alkaline additive material appears to be present among aggregates formed thereon with asphalt coatings thereby to develop some lubrication effect. This allows the pavement body before the saponification reaction to remain in a low viscosity state. In particular, the present invention employs the lubricative solidification material that contains a fatty acid and a resin acid with a certain ratio thereby to maintain such a low viscosity state not only under ordinary temperature but also under a low temperature condition.

After such an asphalt mixture according to the present invention is used for pavement construction, the hardening accelerator (e.g., water) is sprayed thereon and compaction is performed using a roller. Otherwise, after compaction using a roller, the hardening accelerator (e.g., water) is sprayed. This allows the lubricative solidification material contained in the asphalt mixture and the alkaline additive material to be subjected to saponification reaction and to be solidified by virtue of the hardening accelerator (e.g., water), and the strength can thus be enhanced. Note that, when performing pavement using the asphalt mixture according to the present invention, the method of compaction is not limited to a method using roller compaction and may appropriately be selected depending on the purpose of pavement, and a method by beating may also be employed according to the purpose of pavement, for example.

FIG. 1 is a diagram illustrating a relationship between the available temperature range (construction temperature range) and the binder viscosity each for the asphalt mixture according to the present invention and a conventional hot asphalt mixture (a hot asphalt mixture that does not contain a lubricative solidification material and an alkaline additive material). The asphalt mixture according to the present invention has a wider available temperature range than that of the conventional hot asphalt mixture, and can be used for pavement construction even under a temperature of 100° C. or less. Moreover, the hardening accelerator (e.g., water) may be added thereby to promptly enhance the binder viscosity to a degree comparable with that of the conventional hot asphalt mixture.

Each material that constitutes the asphalt mixture according to the present invention will then be described. The asphalt mixture according to the present invention is configured to contain an aggregate, an asphalt, a lubricative solidification material, and an alkaline additive material.

The aggregate to appropriately be used may be, such as, but not limited to, crushed stone, sand or stone powder, which may be used for typical asphalt for pavement, and an aggregate of any granularity range, such as dense-grade or open-grade, may be used without restriction. As one example, an aggregate may be used of which the 2.36 mm sieve passing mass percentage is 15-80%, which is a ratio of particles passing through a sieve mesh with an aperture of 2.36 mm.

The asphalt to be used may be, such as, but not limited to, straight asphalt or modified asphalt.

Note that the aggregate and the asphalt to be used in the present invention may contain a recycled aggregate as substitute for regular aggregate.

The lubricative solidification material to be used in the present invention contains a fatty acid and a resin acid. The content ratio of the fatty acid and the resin acid that constitute the lubricative solidification material to be used in the present invention is 99.5:0.5 to 80:20, preferably 99:1 to 85:15, and more preferably 99:1 to 88:12, as a weight ratio of "fatty acid:resin acid". If the lubricative solidification material does not contain any resin acid, or contains unduly less content of resin acid even in the case where a resin acid is contained, then the development of the strength may be insufficient when water as the hardening accelerator is added, and a desired pavement body cannot be obtained. If, on the other hand, the content of resin acid is unduly large, then the workability at the time of pavement construction, in particular the workability under a low temperature condition, deteriorates, so that the pavement construction will be difficult.

Note that any of a saturated fatty acid and an unsaturated fatty acid can be used as the fatty acid that constitutes the lubricative solidification material, but it is preferred in the present invention that the fatty acid to be used contains at least palmitic acid, stearic acid, oleic acid, and linoleic acid (including conjugated linoleic acid). Using the fatty acid that contains such acids may improve the workability at the time of pavement construction, in particular the workability under a low temperature condition. More specifically, it is preferred that the ratio of each component in the fatty acid that constitutes the lubricative solidification material in the present invention is as follows, in which case the workability at the time of pavement construction, in particular the workability under a low temperature condition, may particularly be improved:

palmitic acid: preferably 0.5-10 wt %, and more preferably 1-6 wt %;

stearic acid: preferably 0.5-8 wt %, and more preferably 1-4 wt %;

oleic acid: preferably 15-65 wt %, and more preferably 30-50 wt %; and linoleic acid (including conjugated linoleic acid): preferably 15-70 wt %, and more preferably 30-45 wt %.

As the resin acid that constitutes the lubricative solidification material, polycyclic diterpene having a carboxyl group and a carbon number of 20 may be mentioned, and specific examples thereof to be preferably used include rosin that contains at least one type of abietic acid, dehydroabietic acid, neoabietic acid, pimaric acid, isopimaric acid, and palustric acid. According to the present invention, the lubricative solidification material configured by compounding a certain amount of such resin acid to fatty acid may be used thereby to allow the strength to be developed sufficiently when water as the hardening accelerator is added.

It is preferred that the content ratio of the lubricative solidification material in the asphalt mixture according to the present invention is within a range of 10:90 to 90:10 as a weight ratio of "asphalt:lubricative solidification material". Note that the addition amount of the lubricative solidification material may preferably be determined depending on the condition for pavement construction because the available temperature range is extended as the addition amount of the lubricative solidification material is increased.

The acid value of the lubricative solidification material to be used in the present invention is not particularly limited, but may preferably be 170-220 mgKOH/g, and more preferably 180-200 mgKOH/g.

The alkaline additive material may not be particularly limited if being a compound that becomes an alkaline component due to the action of the hardening accelerator (e.g., water), wherein preferable one is to exhibit a low hydrogen-ion concentration (i.e., high pH) due to the action of the hardening accelerator in order to neutralize the fatty acid, and it is also possible to use typical ones, such as sodium hydroxide and potassium hydroxide, which may typically be used in soapmaking, but from the environmental view point, an ordinary cement (ordinary Portland cement) may preferably be used which exhibits a low hydrogen-ion concentration due to the action of the hardening accelerator among cements that are used as typical civil engineering material. Examples of the ordinary Portland cement to be used include those which contain, as main components, tricalcium silicate ($3CaO.SiO_2$), dicalcium silicate ($2CaO.SiO_2$), calcium aluminate ($3CaO.Al_2O_3$), calcium aluminoferrite ($4CaO.Al_2O_3.Fe_2O_3$), calcium sulfate ($CaSO_4.2H_2O$), or other appropriate substance. Other than the above, aqueous solution that contains metal ions, such as sodium ions ($Na^+$, potassium ions ($K^+$), magnesium ions ($Mg^{2+}$) and calcium ions ($Ca^{2+}$), or powder that contains metal salt generating the above ions by being added thereto with water, or sodium hydrogen carbonate ($NaHCO_3$), potassium hydrogen carbonate ($KHCO_3$), or other appropriate substance, may be used as the alkaline additive material. The content ratio of the alkaline additive material in the asphalt mixture according to the present invention is preferably within a range of 100:10 to 100:300 as a weight ratio of "lubricative solidification material:alkaline additive material", and more preferably within a range of 100:15 to 100:40.

So long as the action and the advantageous effect of the present invention are not impaired, other additives that are usually used in the field of asphalt pavement may be added to the asphalt mixture according to the present invention other than the above. Such additives may be, such as, but not limited to, filler, plant fiber, pigment, and antifreezing agent.

<<First Embodiment>>

The asphalt mixture according to the present invention may be produced by the method as will be described below, for example, and the obtained mixture may be enclosed in a bag that comprises a moisture permeation preventing layer and a thermal fusion bonding layer, and can thereby be stored for long period of time (e.g., 6 months).

A process for production of the asphalt mixture according to the present embodiment will hereinafter be described.

First, an aggregate is put into a mixing apparatus, and dry mixing for the aggregate is performed. The dry mixing may be performed under a condition where the aggregate is heated to 100-170° C., preferably 100-140° C., and more preferably 110-130° C. The temperature and the amount of time for the dry mixing are not particularly limited, but the temperature for the dry mixing may ordinarily be 100-140° C., and preferably 110-130° C., while the amount of time for the dry mixing may ordinarily be about 1 second to 1 minute. In the present embodiment, the aggregate is used in the state of being heated to the above temperature thereby to allow the water amount contained in the aggregate to be controlled, so that the preservation stability of the obtained asphalt mixture can be improved.

Asphalt is then added to the mixing apparatus to be mixed with the aggregate. In the present embodiment, after being heated to 130-170° C., and preferably 140-160° C., the asphalt is added to the mixing apparatus, and the mixing of the aggregate and the asphalt is then conducted. Note that the mixing temperature and the mixing time during this operation are not particularly limited if a certain condition is obtained such that the asphalt layer is uniformly formed on the aggregate surface, but the mixing temperature may ordinarily be 100-140° C., and preferably 110-130° C., while the mixing time may ordinarily be about 1 second to 5 minutes.

Subsequently, a lubricative solidification material is added to the mixing apparatus to be mixed with the mixture obtained in the above manner. Note that the lubricative solidification material may be used at ordinary temperature, but may preferably be used after being heated to about 15-25° C., such as during the cold months. Note also that the mixing temperature and the mixing time during this operation are not particularly limited, but the mixing temperature may ordinarily be 100-140° C., and preferably 110-130° C., while the mixing time may ordinarily be about 1 second to 5 minutes.

Thereafter, an alkaline additive material is added to the mixing apparatus to be mixed with the mixture obtained in the above manner. The mixing temperature and the mixing time during this operation are not particularly limited, but the mixing temperature may ordinarily be 100-140° C., and preferably 110-130° C., while the mixing time may ordinarily be about 1 second to 5 minutes.

In the present embodiment, the aggregate and the asphalt are mixed first, and the lubricative solidification material and the alkaline additive material in this order are then added and mixed thereby to allow the obtained asphalt mixture to have such a configuration that: some asphalt coating is formed on the surface of the aggregate; a layer comprising the lubricative solidification material is formed on the surface of the asphalt coating; and the alkaline additive material in a solid form covers the layer comprising the lubricative solidification material. This can enhance the reaction efficiency between the alkaline additive material and the hardening accelerator, and even if a relatively small amount of the alkaline additive material is added, the strength improvement effect can sufficiently be developed when the hardening accelerator is added. In addition, the alkaline additive material may be added with a relatively small amount thereby to allow the obtained asphalt mixture to have excellent preservation stability.

The mixture obtained in the above manner is then taken out from the mixing apparatus in a state of being maintained at a temperature of 100-130° C., and the asphalt mixture according to the present embodiment can thus be produced.

In the present embodiment, a bag that comprises a moisture permeation preventing layer and a thermal fusion bonding layer is filled with the asphalt mixture obtained in such a manner, and the thermal fusion bonding layer is then heated and pressed using a heat sealer or the like so that the thermal fusion bonding layer is thermally fused and bonded, whereby the asphalt mixture is enclosed in the bag. According to the present embodiment, the bag having a moisture permeation preventing layer is used as a bag for enclosing the asphalt mixture thereby to reduce the water amount getting through the bag (e.g., to reduce the water amount getting through the bag to about 0.1-1% or less), so that the asphalt mixture has excellent preservation stability. Moreover, the asphalt mixture is enclosed in the bag that comprises a moisture permeation preventing layer and a thermal fusion bonding layer in such a manner, thereby to prevent the alkaline additive material contained in the asphalt mixture from being deactivated due to the reaction with water, and the compounding amount of the alkaline additive material can thus be relatively small. More specifically, the compounding amount of the alkaline additive material may preferably be within a range of 100:15 to 100:40 as a weight ratio of "lubricative solidification material:alkaline additive material".

In the bag that comprises a moisture permeation preventing layer and a thermal fusion bonding layer to be used in the present embodiment, examples of material that constitutes the moisture permeation preventing layer include nylon and ethylene-vinylalcohol copolymer. Examples of material that constitutes the thermal fusion bonding layer include polyolefin. In the present embodiment, the bag that comprises a moisture permeation preventing layer and a thermal fusion bonding layer may preferably be one that has a three-layer structure of thermal fusion bonding layer/moisture permeation preventing layer/thermal fusion bonding layer, and particularly preferably one that has a three-layer structure of polyolefin layer/nylon layer/polyolefin layer. A base material that constitutes the bag comprising a moisture permeation preventing layer and a thermal fusion bonding layer to be used in the present embodiment (portion other than the moisture permeation preventing layer and the thermal fusion bonding layer) is not particularly limited, and examples thereof include paper and aluminum foil.

The asphalt mixture obtained in such a manner may be put out from the bag comprising a moisture permeation preventing layer and a thermal fusion bonding layer and used for pavement construction, for example, and then added thereto with the hardening accelerator (e.g., water) and compacted (or otherwise compacted and then added thereto with the hardening accelerator), and the lubricative solidification material and the alkaline additive material that are contained in the asphalt mixture can thus be subjected to saponification reaction and solidified due to the hardening accelerator thereby to develop the strength. In particular, the asphalt mixture according to the present embodiment has an enhanced initial strength compared with that of a conventional ordinary temperature mixture packed in a bag, and the strength is developed at an early stage.

<<Second Embodiment>>

In an alternative embodiment of the present invention, the mixture to be obtained in the above process may be configured such that the alkaline additive material is added thereto, in addition to the hardening accelerator (e.g., water), when the lubricative solidification material and the alkaline component are subjected to saponification reaction.

In this case, the above-described alkaline additive material may be used as the alkaline additive material to be added with the hardening accelerator, for example, but it is particularly preferred to use potassium pyrophosphate.

According to the present embodiment, by employing a configuration such that the alkaline additive material is added in addition to the hardening accelerator when the lubricative solidification material and the alkaline component are subjected to saponification reaction, the ratio of the alkaline additive material to be contained in the asphalt mixture can be suppressed to a low value thereby to enhance the preservation stability of the asphalt mixture. For example, in this case, the ratio of the alkaline additive material in the asphalt mixture may preferably be within a range of 100:1 to 100:10 as a weight ratio of "lubricative solidification material:alkaline additive material". Otherwise, in this case, the alkaline additive material may not be added at all. Further, in this case, if the ratio of the alkaline additive material in the asphalt mixture is suppressed to a low value, then it is possible even to use a bag that does not have any moisture permeation preventing layer or a bag that has less sealing property as the bag for enclosing the asphalt mixture. In addition, the asphalt mixture according to the present embodiment has an enhanced initial strength compared with that of a conventional ordinary temperature mixture packed in a bag, and the strength is developed at an early stage.

EXAMPLES

The present invention will hereinafter be described with reference to more detailed examples, but the present invention is not limited to these examples.

Example 1

An asphalt mixture was obtained by compounding 93.8 parts by weight of aggregate having a combined granularity shown in Table 1 below, 3.1 parts by weight of straight asphalt, 2.5 parts by weight of lubricative solidification material (trade name "HARTALL FA-1" available from Harima Chemicals Group, Inc.), and 0.6 parts by weight of ordinary Portland cement into a twin-shaft pug mill-type mixer (1 batch: 30-60 kg) in this order and mixing them. Note that, during this operation, the heating temperature of aggregate was 120° C., the heating temperature of asphalt was 165° C., and other members were at ordinary temperature. Note also that the lubricative solidification material (trade name "HARTALL FA-1" available from Harima Chemicals Group, Inc.) used in Example 1 has properties below:

"fatty acid:resin acid"=98.5:1.5 (weight ratio);

unsaponifiable matter content: 2.0 wt %;

component ratio of fatty acid: 1-3 wt % of palmitic acid, 1-3 wt % of stearic acid, 40-50 wt % of oleic acid, and 35-45 wt % of linoleic acid (including conjugated linoleic acid);

type of resin acid: rosin; and acid value: 194 mgKOH/g.

TABLE 1

| Passing mass percentage (%) | | |
|---|---|---|
| | 19.0 mm | 100.0 |
| | 13.2 mm | 98.1 |
| | 4.75 mm | 59.7 |
| | 2.36 mm | 36.1 |
| | 600 μm | 20.9 |
| | 300 μm | 13.9 |
| | 150 μm | 8.3 |
| | 75 μm | 5.6 |

Further, the asphalt mixture obtained in such a manner was cured using a drier (and in a bag) until the asphalt mixture would reach a constant temperature of 60° C., and then put into a mold (formwork), followed by addition of water, thus a product under test was obtained.

[Marshall Stability]

Marshall stability test was then conducted using the obtained product under test. The Marshall stability test was performed each after 1 hour, 3 hours, 1 day, 3 days, and 7 days from the preparation of the product under test. The Marshall stability test was performed at 20° C. after 1 hour, 3 hours, 1 day, and 3 days, and at 60° C. after 7 days. Results are listed in Table 2. It can be determined that a stable and high-strength product under test is obtained at an earlier stage as the Marshall stability value increases at an earlier stage.

[Workability test]

In addition, the workability of the obtained asphalt mixture was evaluated using a workability evaluation tester 100 shown in FIG. 2. The workability evaluation tester 100 shown in FIG. 2 comprises a cylindrical container 110 for being located therein with the asphalt mixture and an elevating handle 130 for moving the cylindrical container 110 in up-and-down directions. The workability evaluation tester 100 further has a rotating impeller 122 held by a shaft 121, and the rotary drive force from a drive source 140 is transmitted via a gearbox 141 and the shaft 121 to the rotating impeller 122, which can thereby be rotatable. The workability evaluation tester 100 further comprises a digital torque meter 142 for measuring the rotary torque of the drive source 140, and the rotary torque measured by the digital torque meter 142 is transmitted to a data logger 160 via a communication line 150.

In the present example, evaluation of the workability was conducted such that the cylindrical container 110 was moved upward using the elevating handle 130 until the rotating impeller 122 would be buried fully in the recycled hot asphalt mixture located in the cylindrical container 110, and in this state the rotary torque necessary for the rotating impeller 122 to rotate was measured. Note that evaluation of the workability was conducted under each condition of 20° C. and 0° C., and criteria for evaluation were as follows. Results are listed in Table 3. A smaller torque allows the handling by a smaller force and can be determined to exhibit excellent workability. More specifically, evaluation "A" and evaluation "B" can be determined as representing sufficient workability and allowing excellent pavement construction, while evaluation "C" as being incapable of pavement construction:

A: rotary torque less than 5 N·m;
B: rotary torque of 5 N·m or more and less than 8 N·m; and
C: rotary torque of 8 N·m or more.

Example 2

An asphalt mixture was obtained and evaluated like in Example 1 except for using 2.5 parts of lubricative solidification material (trade name "HARTALL FA-1P" available from Harima Chemicals Group, Inc.) as substitute for 2.5 parts of lubricative solidification material (trade name "HARTALL FA-1" available from Harima Chemicals Group, Inc.). Results are listed in Table 2 and Table 3.

Note that the lubricative solidification material (trade name "HARTALL FA-1P" available from Harima Chemicals Group, Inc.) used in Example 2 has properties below:
"fatty acid:resin acid"=95.4:4.6 (weight ratio);
unsaponifiable matter content: 2.0 wt %;
component ratio of fatty acid: 1-4 wt % of palmitic acid, 1-4 wt % of stearic acid, 35-45 wt % of oleic acid, and 35-45 wt % of linoleic acid (including conjugated linoleic acid);
type of resin acid: rosin; and
acid value: 193 mgKOH/g.

Example 3

An asphalt mixture was obtained and evaluated like in Example 1 except for using 2.5 parts of lubricative solidification material (trade name "HARTALL FA-3S" available from Harima Chemicals Group, Inc.) as substitute for 2.5 parts of lubricative solidification material (trade name "HARTALL FA-1" available from Harima Chemicals Group, Inc.). Results are listed in Table 2 and Table 3.

Note that the lubricative solidification material (trade name "HARTALL FA-3S" available from Harima Chemicals Group, Inc.) used in Example 3 has properties below:
"fatty acid:resin acid"=89.7:10.3 (weight ratio);
unsaponifiable matter content: 2.5 wt %;
component ratio of fatty acid: 3-6 wt % of palmitic acid, 1-4 wt % of stearic acid, 30-40 wt % of oleic acid, and 30-40 wt % of linoleic acid (including conjugated linoleic acid);
type of resin acid: rosin; and
acid value: 191 mgKOH/g.

Comparative Example 1

An asphalt mixture was obtained and evaluated like in Example 1 except for using 2.5 parts of lubricative solidification material (trade name "HARTALL SR-20" available from Harima Chemicals Group, Inc.) as substitute for 2.5 parts of lubricative solidification material (trade name "HARTALL FA-1" available from Harima Chemicals Group, Inc.). Results are listed in Table 2 and Table 3.

Note that the lubricative solidification material (trade name "HARTALL SR-20" available from Harima Chemicals Group, Inc.) used in Comparative Example 1 has properties below:
"fatty acid:resin acid"=77.9:22.1 (weight ratio);
unsaponifiable matter content: 5 wt %; and
acid value: 160 mgKOH/g.

Comparative Example 2

An asphalt mixture was obtained and evaluated like in Example 1 except for using 2.5 parts of lubricative solidification material (trade name "HARTALL SR-30" available from Harima Chemicals Group, Inc.) as substitute for 2.5 parts of lubricative solidification material (trade name "HARTALL FA-1" available from Harima Chemicals Group, Inc.). Results are listed in Table 2 and Table 3.

Note that the lubricative solidification material (trade name "HARTALL SR-30" available from Harima Chemicals Group, Inc.) used in Comparative Example 2 has properties below:
"fatty acid:resin acid"=56.9:43.1 (weight ratio);
unsaponifiable matter content: 5 wt %; and
acid value: 163 mgKOH/g.

TABLE 2

| | Ratio of acid component in lubricative solidification material | | Ordinary temperature Marshall stability (kN) (20° C.) | | | | |
|---|---|---|---|---|---|---|---|
| | Fatty acid (%) | Resin acid (%) | After 1 hr (20° C.) | After 3 hrs (20° C.) | After 1 day (20° C.) | After 3 days (20° C.) | After 7 days (60° C.) |
| Example 1 | 96.5 | 1.5 | 6.1 | 12.2 | 23.7 | 35 or more | 10.3 |
| Example 2 | 93 | 5 | 5.9 | 11.4 | 22.8 | 35 or more | 10.2 |
| Example 3 | 87.5 | 10 | 5.7 | 9.8 | 21.6 | 33.3 | 10.5 |
| Comparative Example 1 | 74 | 21 | 4.4 | 6.7 | 17.0 | 26.6 | 6.5 |
| Comparative Example 2 | 54 | 41 | 3.4 | 5.7 | 9.4 | 20.6 | 3.7 |

TABLE 3

| | Workability | |
|---|---|---|
| | 20° C. | 0° C. |
| Example 1 | A | A |
| Example 2 | A | A |
| Example 3 | A | B |
| Comparative Example 1 | B | C |
| Comparative Example 2 | C | C |

As shown in Table 2 and Table 3, each of Examples 1-3, which uses the lubricative solidification material that contains a fatty acid and a resin acid with a ratio of 99.5:0.5 to 80:20 as a weight ratio of "fatty acid:resin acid", results in the Marshall stability value increasing at an early stage and is capable of developing the strength at an early stage, and the workability is excellent under each condition of 20° C. and 0° C.

In contrast, in cases of using the lubricative solidification material that contains a fatty acid with unduly low content ratio, the workability deteriorates at 0° C. in Comparative Example 1 and at 0° C. and 20° C. in Comparative Example 2.

In particular, from the results of the present examples, it can be confirmed that the present invention can provide an asphalt mixture which has excellent workability not only at ordinary temperature (20° C.) but also at a low temperature (0° C.) condition and which can develop the strength at an early stage and can be used for pavement construction under ordinary temperature.

The invention claimed is:

1. An ordinary temperature construction type hot asphalt mixture comprising an aggregate, an asphalt, a lubricative solidification material and an alkaline additive material that are mixed together,
wherein the lubricative solidification material contains a fatty acid and a resin acid with a ratio of 99.5:0.5 to 80:20 as a weight ratio of "fatty acid:resin acid",
the lubricative solidification material contains palmitic acid, stearic acid, oleic acid and linoleic acid including conjugated linoleic acid as the fatty acid, and
each component in the fatty acid has a content ratio of 1-6 wt % of palmitic acid, 1-4 wt % of stearic acid, 30-50 wt % of oleic acid, and 30-45 wt % of total of linoleic acid including conjugated linoleic acid.

2. An ordinary temperature construction type hot asphalt mixture comprising an aggregate, an asphalt and a lubricative solidification material that are mixed together,
wherein the lubricative solidification material contains a fatty acid and a resin acid with a ratio of 99.5:0.5 to 80:20 as a weight ratio of "fatty acid:resin acid",
the lubricative solidification material contains palmitic acid, stearic acid, oleic acid and linoleic acid including conjugated linoleic acid as the fatty acid, and
each component in the fatty acid has a content ratio of 1-6 wt % of palmitic acid, 1-4 wt % of stearic acid, 30-50 wt % of oleic acid, and 30-45 wt % of total of linoleic acid including conjugated linoleic acid.

* * * * *